(12) United States Patent
Kanaga

(10) Patent No.: US 6,877,238 B2
(45) Date of Patent: Apr. 12, 2005

(54) SYSTEM FOR PRECISION MITER CUTTING

(76) Inventor: Lawrence W. Kanaga, 35 Old Tavern Rd. P.O. Box 905, Orange, CT (US) 06477-0905

( * ) Notice: Subject to any disclaimer, the term of this patent is extended or adjusted under 35 U.S.C. 154(b) by 0 days.

(21) Appl. No.: 10/446,596

(22) Filed: May 28, 2003

(65) Prior Publication Data
US 2004/0237320 A1 Dec. 2, 2004

(51) Int. Cl.⁷ .................................................. B43L 7/10
(52) U.S. Cl. ........................................... 33/455; 33/534
(58) Field of Search .......................... 33/455, 520, 644, 33/534, 471, 456, 640

(56) References Cited

U.S. PATENT DOCUMENTS

| | | | |
|---|---|---|---|
| 60,646 A | * 12/1866 | Snyder | ........................ 33/455 |
| 1,048,319 A | 12/1912 | Knights | |
| 1,420,175 A | * 6/1922 | Perez | ........................ 33/456 |
| 1,454,782 A | * 5/1923 | Wimmer | ........................ 33/455 |
| 1,660,578 A | 2/1928 | Reppell | |
| 2,866,270 A | * 12/1958 | Johnson et al. | ............... 33/455 |
| 4,441,394 A | 4/1984 | Barsotti | |
| 4,527,341 A | * 7/1985 | Schon | ........................ 33/455 |
| 5,402,701 A | 4/1995 | Ingram | |
| 5,473,821 A | 12/1995 | DiMarco | ........................ 33/456 |
| 5,737,990 A | 4/1998 | Freeland et al. | |
| 6,604,294 B1 | * 8/2003 | Farley | ........................ 33/455 |

* cited by examiner

Primary Examiner—Christopher W. Fulton

(57) ABSTRACT

A system for modeling a recessed or protruding angle formed by convergent surfaces and transferring that modeled angle directly to a miter saw for facilitating the cutting of workpieces in conformance with the bisection of that modeled angle. This system may be manufactured with, or retrofitted onto a standard miter saw or used with a hand miter saw designed to accommodate the system.

12 Claims, 9 Drawing Sheets

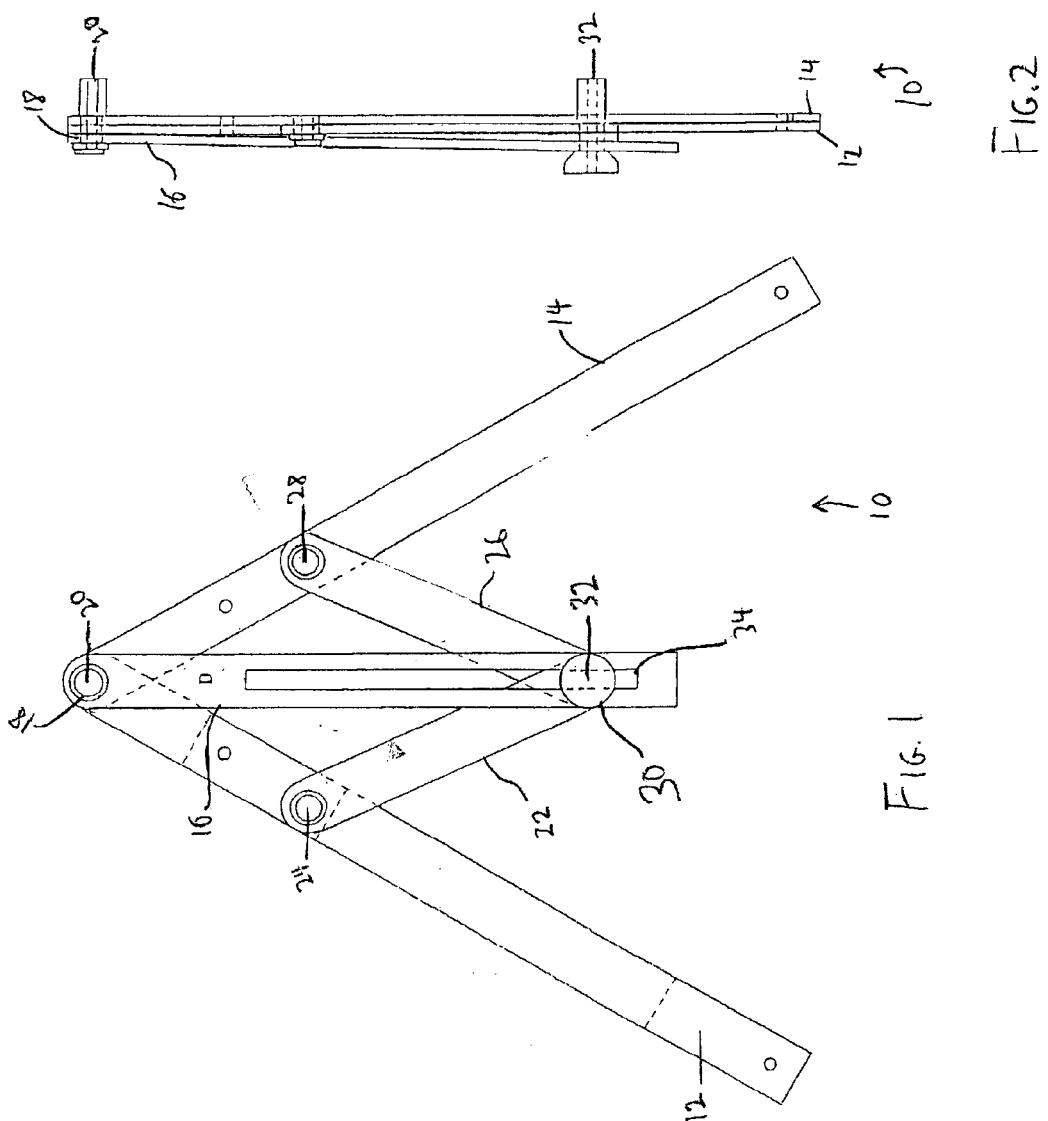

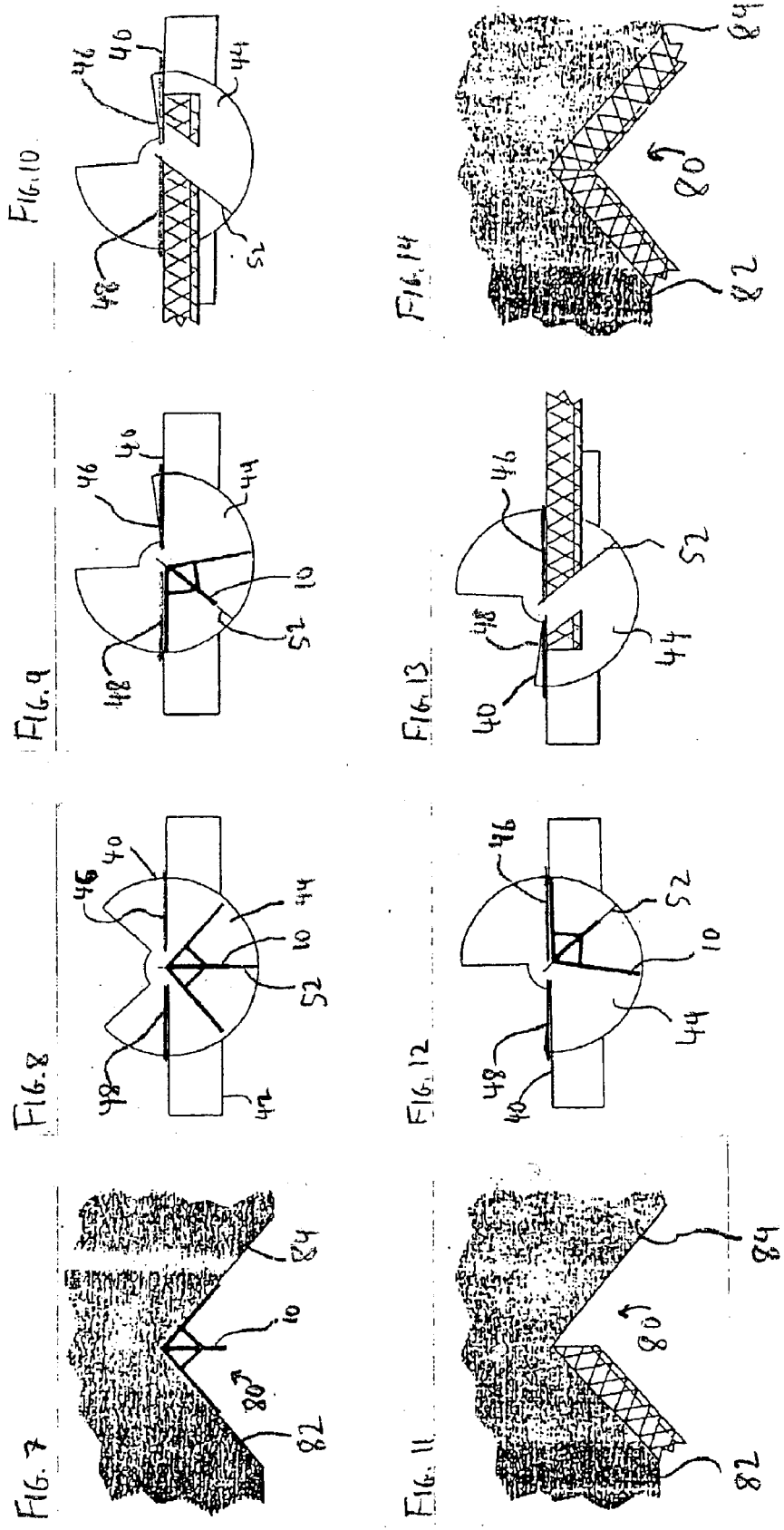

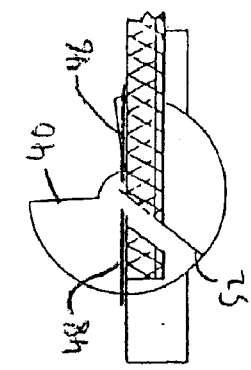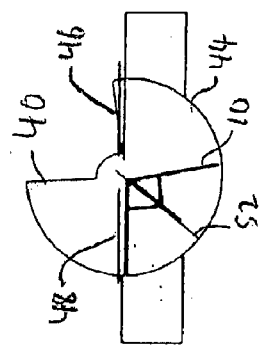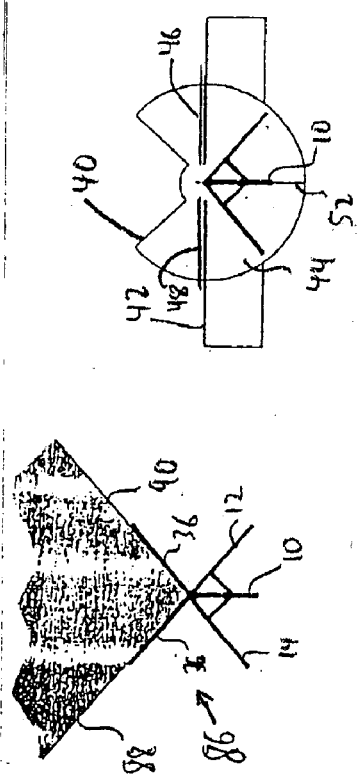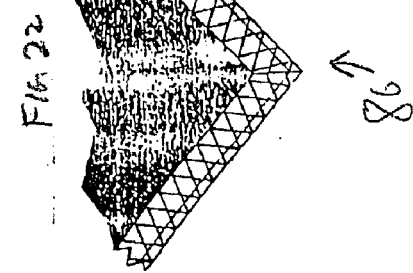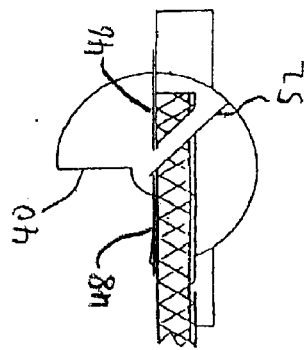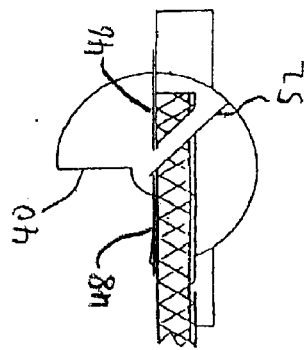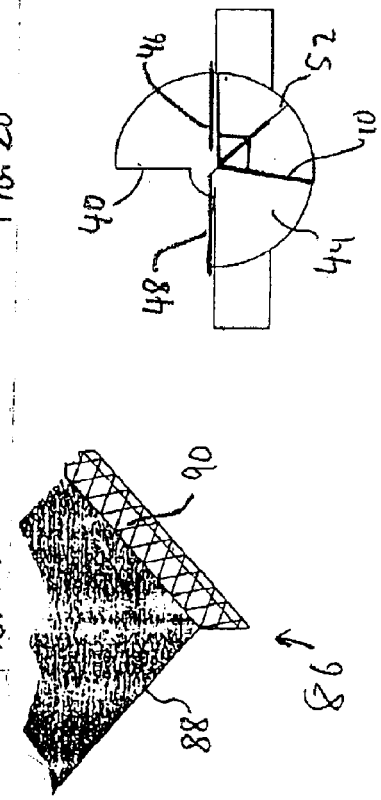

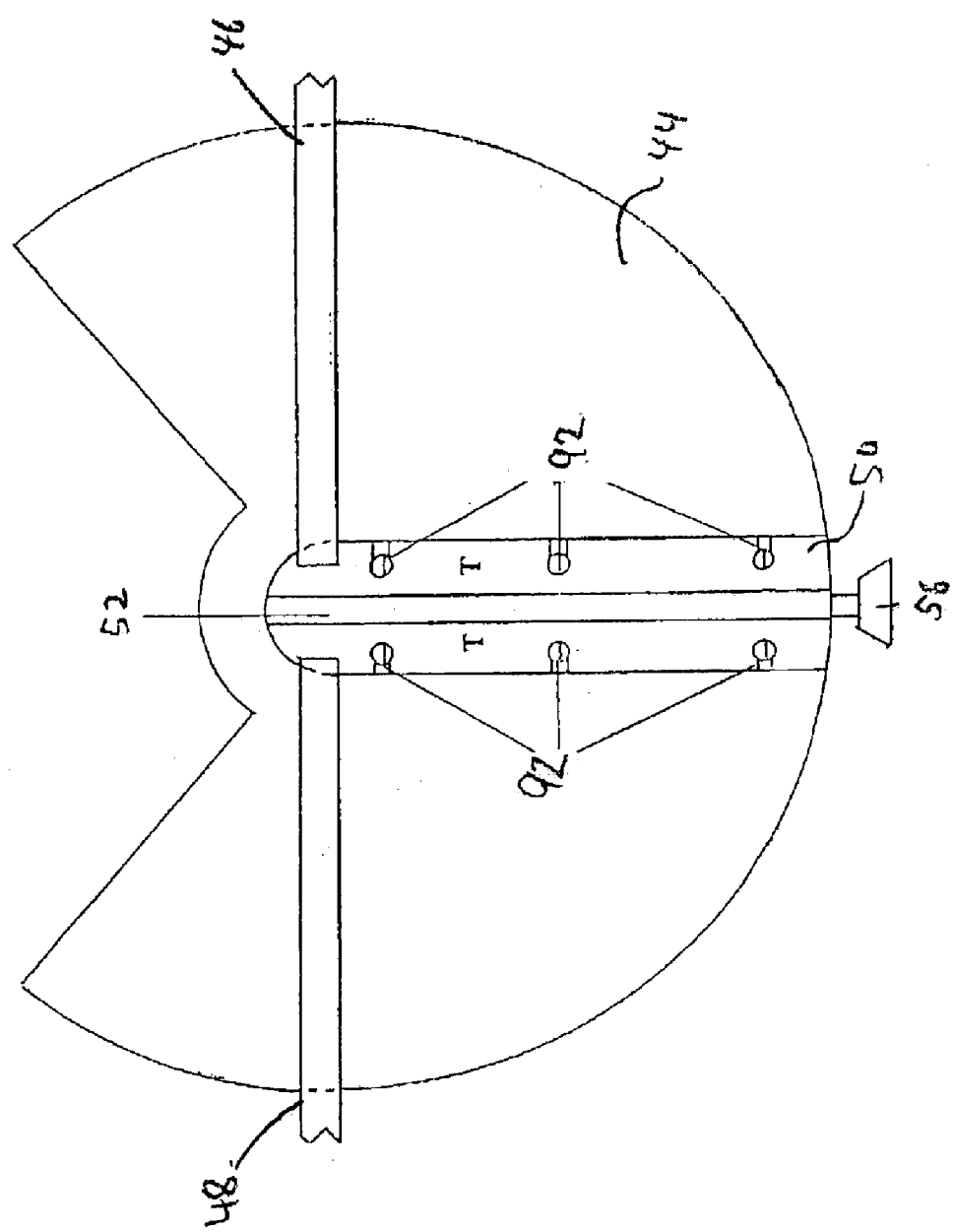

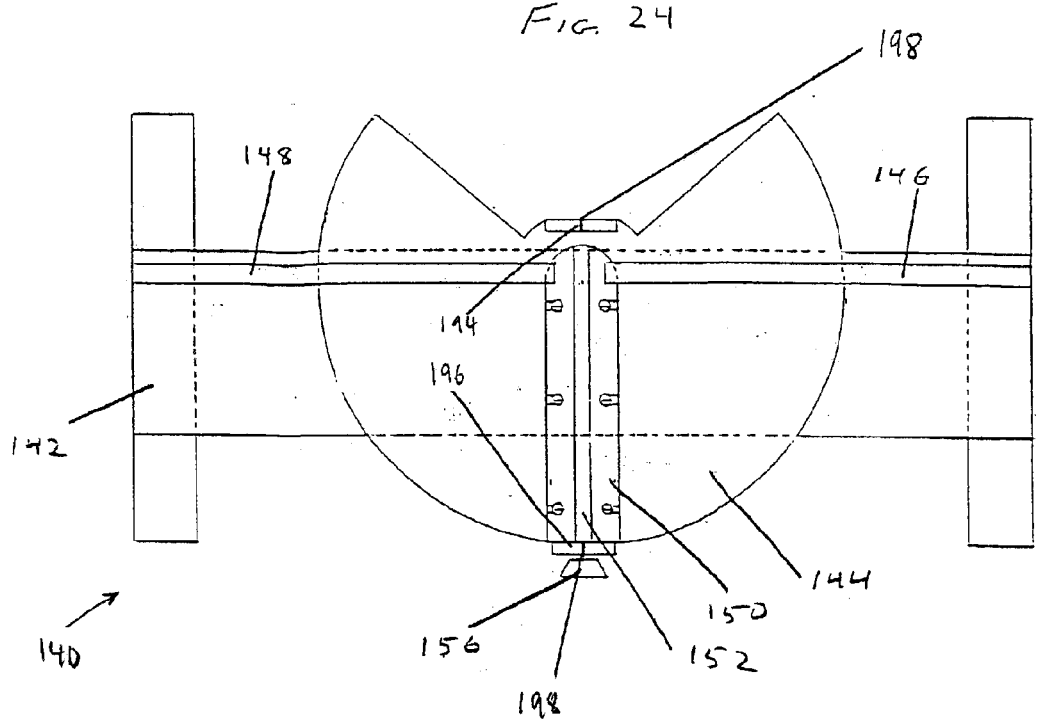
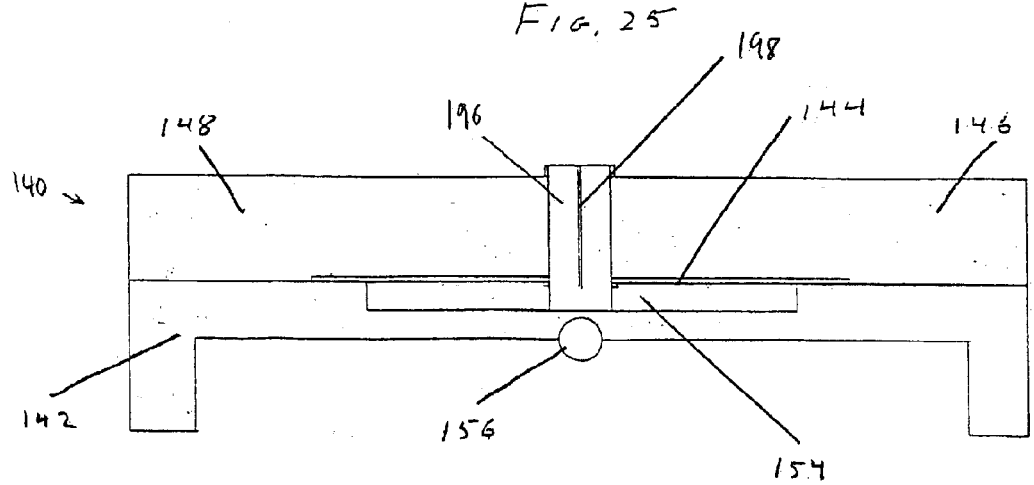

SYSTEM FOR PRECISION MITER CUTTING

BACKGROUND OF THE INVENTION

1. Field of the Invention

The present invention relates to a system for miter cutting, and more particularly, to a system for miter cutting that includes a device for modeling the angle of convergent surfaces and transposing the modeled angle to a miter saw for miter cutting through a slot defined on the miter saw.

2. Background of the Related Art

The primary function of a miter saw is to cut a piece of material (hereinafter also referred to as a "workpiece") at a defined angle. Miter saws are most often used to prepare moldings or decorative trim to fit adjacent to surfaces that converge to form an angle, such as an inside or outside corner, so that the moldings or trim appear to follow along the surfaces continuously.

For practical reasons as well as aesthetics, the workpieces are fit to the convergent surfaces by cutting each of the workpieces at an angle which equals, as nearly as possible, one half of the angle formed at the convergence.

Most, if not all, miter saws have preset locking positions for various angles and setting the cutting angle is easily accomplished if the convergence angle corresponds with one of these positions. For example, virtually all miter saws have a preset position for 45 degrees to facilitate cutting workpieces to fit a 90 degree convergence angle.

However, the process becomes more difficult if the convergence angle does not correspond to an angle having a preset cutting position on the miter saw. This circumstance is encountered more often than not, especially throughout existing structures, such as residential homes and apartments.

In these circumstances, half the convergence angle must be measured and transferred to the miter saw in a way that enables the miter saw to be positioned for cutting each workpiece accordingly. Moreover, most moldings or trim are not of equidimensional design, in that they have a planar surface which opposes an ornamental surface and top and bottom edges which may differ in width. For such applications, the miter saw can be set so that a first workpiece is cut to half the convergent angle for the workpiece to be placed along a first convergent surface, but the miter saw must then be set to the inverse or mirror image of the first angle before cutting the second workpiece so that the second workpiece can be positioned along the second convergent surface with the correct orientation. Thus, the measured angle of convergence must be measured and/or transferred to the miter saw twice.

Some devices exist which can measure both internal and external existing angles in degrees, enabling the operator to set the miter saw to one half of that angle by using the saw's miter scale. Other devices duplicate the existing angle and provide a means for transferring one half of that angle to the workpiece by pencil, or scribe, enabling the operator to set the miter saw by visual reference to that line.

The primary problems associated with using such devices are that they are prone to inaccuracies, because, among other things, they involve one or more intermediate steps between the measurement of the existing angle and the setting of the miter saw, each of which is capable of introducing error.

U.S. Pat. No. 5,473,821 to DeMarco discloses a device that can model a convergence angle and transfer one half of that angle to a power miter saw, but only if the miter saw is manufactured to resemble the miter saw described by DeMarco (hereinafter also referred to as the "DeMarco miter saw"). The Demarco miter saw, as described in the '821 patent, deviates from standard power miter saws so much that it would be impossible to use the DeMarco angle-modeling device on miter saws which have not been specifically manufactured in accordance therewith. DeMarco does not demonstrate flaws in the standard power miter saw design or provide justification for changing manufacturing practices to produce miter saws as those shown in the '821 patent, and his design introduces a variety of problems not presented by the standard design.

For example, a workpiece placed on the DeMarco miter saw is held against a guide fence on only one side of the cut rather than both sides as it is with standard designs. This configuration decreases support for the workpiece and increases the possibility that it will move during the cutting process, thereby compromising accuracy, since the cutting action of the blade tends to move or bend the workpiece. The configuration also reduces the operator's options with regard to stabilizing the workpiece against the fence, thus creating safety issues which are not found in the standard design.

Another problem with the DeMarco design relates to the need to move the fences to duplicate the angel of convergence. This configuration increases the complexity and difficulty associated with using the DeMarco miter saw because it requires the reorientation of the workpiece, and any workpiece support system, for different angles and for mitering separate pieces to frame the same angle. In contrast, with the standard design the workpiece is always cut along the same axis, which generally corresponds to a workbench or other support system for the workpiece.

The DeMarco miter saw presents further difficulty in using it to frame an interior angle because each fence blocks the path of a workpiece placed against the other, thus eliminating the operators ability to make one cut for both dimension and angle.

Thus, there is a need for a device which overcomes the problems associated with the prior art as described above. In particular, what is needed is a system or device for modeling an angle formed by convergent surfaces and transferring one half of that angle directly to a miter saw, which can be employed with power miter saws of standard design and hand miter saws designed to accommodate it. Clearly, a device such as this would increase the speed, accuracy and efficiency of the miter saw and miter cutting process.

SUMMARY OF THE INVENTION

The present invention solves the problems of the prior art by, among other things, providing a device for modeling an angle formed by two convergent surfaces and a system for transferring one half of that modeled angle directly to a miter saw to facilitate the cutting of workpieces to border the convergent surfaces, which can be manufactured with or retrofitted onto a standard power miter saw and can also be used with a hand miter saw which is designed to accommodate it.

The present invention consists of a tool and miter saw having a slot defined thereon. The miter saw is configured so that the slot remains parallel to the cutting plane of the miter saw as it is rotated relative to a fixed fence or other device for aligning the workpiece. The tool models the angle of convergence via pivotally connected angle framing arms which are then fixed in position; bisects that angle by support links which are pivotally connected to each other and to each of the framing arms; and transfers the appropriate cutting angle to the miter saw. In this embodiment, the transfer is accomplished by one or more positioning members, which are used to align the bisecting line of the convergence angle with the longitudinal axis of the slot.

The tool is configured so that one framing arm may be placed against and adjacent to each of the convergent sides of an interior angle, with the pivotal coupling of the framing arms being equidistant from the outside edge of each. The pivotal couplings of the framing arms to the support links are equidistant from the outside edge of each framing arm and from the pivotal coupling of the framing arms. The pivotal coupling of the support links is equidistant from the pivotal coupling of each support link to a framing arm.

The present invention is also directed to a system for facilitating miter cutting which includes a tool for modeling a convergence of two surfaces having a first elongate framing arm pivotally coupled with a second elongate framing arm. The first and second framing arms are interconnected by two support links. The first and second framing arms are each pivotally coupled to a support link, which support links, in turn, are pivotally coupled to each other.

This embodiment of a tool constructed in accordance with the present invention also includes a pair of miter positioning members that extend in the same general direction, substantially perpendicularly with respect to the plane of the tool. The miter positioning members are centered on a line between the pivotal coupling of the framing arms and the pivotal coupling of the support links. Preferably, one positioning member is aligned with and directly below the pivotal coupling of the framing arms and the other is aligned with and directly below the coupling of the support links.

A fastener is also provided for adjusting the rigidity of the tool to control the pivotal movement of the first and second framing arms. The fastener may be associated with one or more of the pivotal couplings.

In one embodiment, the tool includes an elongate central arm which shares the pivotal coupling between the first and second framing arms and includes a longitudinal slot defined therein along which the pivotal coupling of the support links is slidably mounted. In this embodiment, the position of the framing arms may be locked by restricting slidable movement of this pivotal coupling along the longitudinal slot.

A tool constructed in accordance with the present invention can also include a setting or support structure which permits modeling external angles. This may include extending the length of the first and second framing arms along their respective longitudinal axes, such as by attaching extension arms of adjustable length to the first and second framing arms.

The present invention is also directed to a miter saw which includes a base having a rotatably mounted carriage disposed thereon that supports a planar work surface, a fence for aligning and affixing the workpiece thereto, which may be in two or more linearly aligned fence segments, is perpendicular to the working surface and is mounted on the base or in such other manner that it remains stationary as the work surface rotates; a knob or other assembly for directing the rotation of the rotatably mounted carriage and work surface disposed thereon and locking the carriage and work surface in a desired position; and a pivoting arm or other means for bringing a saw blade to the work surface which is mounted on the carriage and rotates with the work surface.

This embodiment of a system constructed in accordance with the present invention includes a substantially planar kerf plate for being mounted in, and substantially flush with, the rotatably mounted work surface of a miter saw either as original equipment on a miter saw designed to be utilized with the present invention or as a replacement for the kerf plate on an existing miter saw. The kerf plate of this embodiment has a central slot which is substantially parallel to the cutting plane and configured and dimensioned for engaging the miter positioning members of the tool constructed in accordance with the present invention and receiving the saw blade. Preferably, the kerf plate is fabricated from a non-ferrous material.

The system constructed in accordance with the present invention is generally intended for use as described herein. For an interior angle formed by the convergence of two surfaces, the angle is modeled and one half of that angle transposed to the miter saw by placing each framing arm adjacent to one of the surfaces, locking the tool in that position, engaging the miter positioning members in the miter saw kerf plate slot, rotating the work surface until a framing arm is adjacent to the fixed fence and then locking the work surface in that position.

For an exterior angle formed by the convergence of two surfaces, the angle is modeled and one half of that angle transposed to the miter saw by extending the framing arms of the tool, placing each extended arm adjacent to one of the surfaces, locking the tool in that position, releasing or removing the extending portions of the framing arms, engaging the miter positioning members in the kerf plate slot, rotating the work surface until a framing arm is adjacent to the fixed fence and then locking the work surface in that position.

To cut framing pieces for the angle, the saw is set twice. The first piece is cut after the working surface has been rotated to one side, bringing one framing arm to a position adjacent to the fence, and the second piece is cut after the working surface has been rotated to the other side, bringing the other framing arm to a position adjacent to the fence.

In a preferred embodiment constructed in accordance with the present invention, the miter saw includes a base having a rotatably mounted carriage disposed thereon which supports a planar work surface and a locking knob assembly for directing and locking its rotational movement; a fence for aligning and holding the work piece consisting of two fence segments, one on each side of the cutting plane, which are perpendicular to the work surface, linearly aligned and mounted on the base in such a manner that they remain stationary as the work surface rotates; and a spring loaded pivot joint and pivotal arm which supports a housing for a circular blade and electric drive motor. The pivot joint and pivotal arm are configured and mounted to rotate with the work surface, thereby maintaining a fixed position relative to the work surface, and establish a cutting plane which is perpendicular to the work surface and intersects the rotational center of the carriage and work surface.

The miter saw also includes a substantially planar slotted kerf plate mounted in, and substantially flush with, the work surface. The kerf plate slot is disposed over an aperture in the work surface, parallel with respect to, and centered on, the cutting plane. The slot is configured and dimensioned to receive the circular saw blade and engage the miter positioning members of an angle modeling device constructed in accordance with the present invention.

The modeling device includes a first elongate framing arm pivotally coupled with a second elongate framing arm about an elongate central arm. The elongate central arm includes a longitudinal slot defined therein. Two support links are interconnected with the first and second framing arms by pivotal couplings. The pivotal coupling connecting the support links to each other is mounted on the central arm to slide along the longitudinal slot, and includes a fitting, such as a threaded shaft and wing nut or threaded knob, configured to compress the linking arms and the central arm, thereby locking the device in position.

In accordance with this preferred embodiment, the angle modeling device includes two miter positioning members extending in the same direction, perpendicularly with respect to the plane of the tool. One such positioning member is aligned with and directly below the pivotal coupling of the framing arms while the other positioning member is aligned with and directly below the coupling of the support links.

In addition, the device of this preferred embodiment includes detachable extension arms of variable lengths, which extend the length of the first and second framing arms along their respective longitudinal axes, thereby providing a tool to model exterior angles.

In a second preferred embodiment constructed in accordance with the present invention, the miter saw includes a base having a rotatably mounted carriage disposed thereon which supports a planar work surface and a locking knob assembly for directing and locking its rotational movement; a fence for aligning and holding the workpiece consisting of two fence segments, one on each side of the cutting plane, which are perpendicular to the work surface, linearly aligned and mounted on the base in such a manner that they remain stationary as the work surface rotates; two slotted guides mounted at the front and back of the rotatably mounted carriage in such a manner that they rotate with the work surface, thereby maintaining a fixed position relative to it. The slots in the guides are perpendicular to the work surface and configured to engage and guide a hand saw. The guides are mounted in a manner to establish a cutting plane which is perpendicular to the work surface and intersects the rotational center of the carriage and work surface.

The miter saw also includes a substantially planar kerf plate mounted in and substantially flush with, the work surface. The kerf plate slot is disposed over an aperture in the work surface, is parallel to the cutting plane, centered on it, and configured and dimensioned to receive the hand saw blade and to engage the miter positioning members of an angle modeling device as described above.

The present invention is also directed to a method for mitering two pieces of material to frame converging surfaces. The method includes the step of applying a tool at the convergence of the converging surfaces to model the angle of convergence. The tool may include first and second elongate framing arms pivotally coupled to each other at an end thereof, first and second support links, each pivotally coupled to a framing arm at a point which is equidistant from the pivotal coupling of the framing arms. The support links can be pivotally coupled to each other at a point equidistant from their respective pivotal couplings with the framing arms. The tool may further include fastening means for temporarily setting the first and second framing arms in a desired angular relationship facilitated by the pivotal coupling of the first and second framing arms, pivotal couplings of the first and second support links to the first and second framing arms, and the pivotal coupling of the first and second support links to each other, and at least two positioning members extending substantially perpendicular to the plane of the tool and coaxial with the pivotal coupling of the framing arms and the pivotal coupling of the first and second support links to each other, whereby the axis formed between the positioning members bisects the angle formed by the coupling of the first and second framing arms.

The method also includes the steps of locking the tool to maintain the first and second framing arms in a position corresponding to the angle of convergence, and affixing the tool to a miter cutting system.

The miter cutting system may include a rotatable planar work surface and stationary guide fence for supporting a work piece and positioning the work piece in an angular relationship for cutting with a saw, receiving means for the at least two positioning members in the rotatable work surface, whereby alternate rotation of the work surface such that the first and second framing arms abut alternate sides of the guide fence positions the work surface for cutting a work piece along the axis formed between the positioning members.

The positioning members of the tool being received by the receiving means, the method further includes the steps of rotating the work surface until one of the framing arms contacts the guide fence, positioning a first work piece on the work surface in alignment with the guide fence and cutting the work piece with a saw, and removing the cut work piece. With the positioning members of the tool being received by the receiving means, the method further includes rotating the work surface until the other one of the framing arms contacts the guide fence, positioning a second work piece on the work surface in alignment and with the guide fence, cutting the work piece with a saw; and removing the cut workpiece.

Other objects and advantages of the invention will be apparent from the following description, the accompanying drawings and the appended claims.

BRIEF DESCRIPTION OF THE DRAWINGS

So that those having ordinary skill in the art to which the present invention appertains will more readily understand how to make and use the same, reference may be had to the drawings wherein:

FIG. 1 is a top plan view of a tool for modeling angles constructed in accordance with the present invention;

FIG. 2 is a side elevational view of the tool illustrated in FIG. 1;

FIG. 7 is a top view of the tool shown in FIG. 1 positioned in an inside corner formed by two convergent surfaces and configured to model the angle of convergence;

FIG. 8 is a top view of the tool taken from the inside corner as shown in FIG. 7, wherein the tool is positioned on the kerf plate of a miter saw work surface in accordance with the present invention;

FIG. 9 is a top view of the tool positioned on the kerf plate of a miter saw as shown in FIG. 8, wherein the miter saw work surface has been rotated so that a first arm of the tool contacts the fixed fence;

FIG. 10 is a top view of the miter saw work surface rotated as shown in FIG. 9 with a workpiece positioned on the work surface for cutting with the miter saw;

FIG. 11 is a top view of the inside corner of FIG. 7, wherein the workpiece cut by the miter saw as shown in FIG. 10 in accordance with the present invention is positioned to border one of the two converging surfaces forming the inside corner;

FIG. 12 is a top view of the tool configured to model the inside corner as shown in FIG. 7 and positioned on the kerf plate of a miter saw work surface in accordance with the present invention, wherein the miter saw work surface has been rotated so that the second arm of the tool abuts the fixed fence;

FIG. 13 is a top view of the miter saw work surface rotated as shown in FIG. 12 with a workpiece positioned on the work surface for cutting with the miter saw;

FIG. 14 is a top view of the inside corner of FIG. 11, wherein the workpiece cut by the miter saw as shown in FIG. 13 in accordance with the present invention is positioned to border the second of the two converging surfaces forming the inside corner;

FIG. 15 is a top view of the tool shown in FIG. 1 with arm extensions, such as those depicted in FIG. 3, wherein the tool is positioned in an outside corner formed by two convergent surfaces and configured to model the angle of convergence;

FIG. 16 is a top view of the tool taken from the outside corner as shown in FIG. 15, wherein the tool is positioned on the kerf plate of a miter saw work surface without arm extensions in accordance with the present invention;

FIG. 17 is a top view of the tool positioned on the kerf plate of a miter saw as shown in FIG. 16, wherein the miter saw work surface has been rotated so that a first arm of the tool contacts the fixed fence;

FIG. 18 is a top view of the miter saw work surface rotated as shown in FIG. 17 with a workpiece positioned on the work surface for cutting with the miter saw;

FIG. 19 is a top view of the outside corner of FIG. 15, wherein the workpiece cut by the miter saw as shown in FIG. 18 in accordance with the present invention is positioned to border one of the two converging surfaces forming the outside corner;

FIG. 20 is a top view of the tool configured to model the outside corner as shown in FIG. 15, wherein the tool is positioned on the kerf plate of a miter saw work surface without arm extensions in accordance with the present invention and the miter saw work surface has been rotated so that the second arm of the tool abuts the fixed fence;

FIG. 21 is a top view of the miter saw work surface rotated as shown in FIG. 20 with a workpiece positioned on the work surface for cutting with the miter saw;

FIG. 22 is a top view of the outside corner of FIG. 19, wherein the workpiece cut by the miter saw as shown in FIG. 21 in accordance with the present invention is positioned to border the second of the two converging surfaces forming the outside corner;

FIG. 23 is a top plan view of a miter saw work surface with a kerf plate constructed in accordance with the present invention secured thereon.

FIG. 24 is a top plan view of a hand miter saw designed to accommodate a tool for modeling angles constructed in accordance with the present invention; and FIG. 25 is a front elevational view of the saw shown in FIG. 24.

DETAILED DESCRIPTION OF THE PREFERRED EMBODIMENTS

Figure 3:
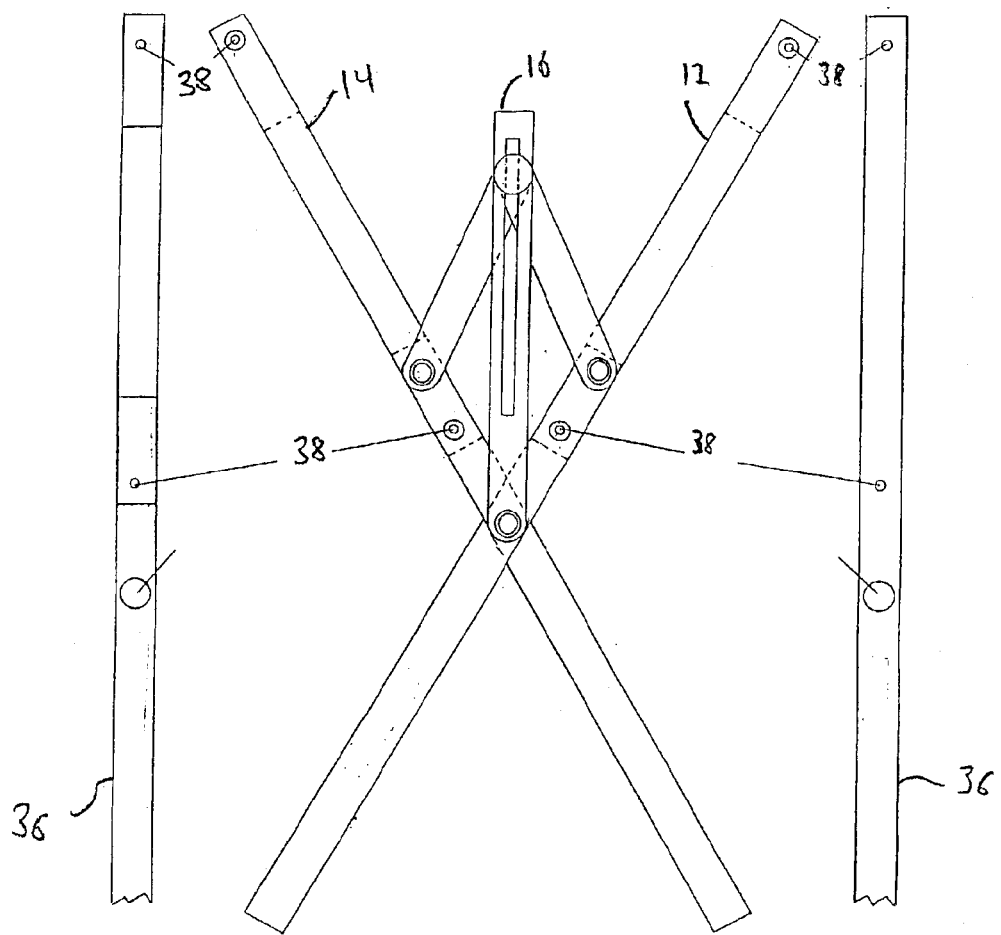
FIG. 3 is a top plan view of the tool shown in FIG. 1, illustrating extensions to the framing arms and attachment points for extensions.

The advantages of a system for perfecting miter cuts constructed or retrofitted on a miter saw in accordance with the present invention will become more readily apparent to those having ordinary skill in the art from the following detailed description of certain preferred embodiments taken in conjunction with the drawings which set forth representative embodiments thereof. Unless otherwise apparent, or stated, directional references, such as "right," "left," "upper," "below," "horizontal" "vertical," "upward" and "downward", are intended to be relative to the orientation of a particular embodiment of the invention as shown in the first numbered view of that embodiment. In addition, a given reference numeral indicates the same or similar structure when it appears in different figures and like reference numerals identify similar structural elements and/or features of the subject invention.

Referring now to FIG. 1, in which there is illustrated a preferred embodiment of a miter angle modeling and transferring tool constructed in accordance with the present invention and generally designated by the reference numeral 10. Tool 10 is substantially planar and includes a left elongate framing arm 12 and a right elongate framing arm 14. This preferred embodiment also includes an elongate central arm 16. The left arm 12 and right arm 14 are pivotally connected adjacent to a first end of each, respectively, by coupling 18, and are configured so that one framing arm may be placed against and adjacent to each of the convergent sides of an interior angle. Left and right arms 12 and 14 can be pivoted via coupling 18 to define an angle between arms 12 and 14. As can be best viewed in FIG. 2, coupling 18 includes a miter positioning member 20 which extends perpendicularly with respect to the plane of tool 10. In this embodiment, miter positioning member 20 is essentially a protrusion, referred to hereinafter as locator pin 20. Locator pin 20 is positioned equidistant from the outer edges of left and right arms 12 and 14, respectively.

A left support link 22 is pivotally interconnected adjacent to a first end thereof, with left arm 12 at a coupling 24. Similarly, a right support link 26 is pivotally interconnected adjacent to a first end thereof, with right arm 14 at a coupling 28.

Left and right support links 22 and 26 are pivotally connected to central arm 16 by a coupling 30. Preferably, coupling 30 is disposed adjacent the second ends of each of the support links 22 and 26. Pivotal connections 24 and 28 are equidistant from pivotal connection 18, pivotal connection 30 and from the outside edges of framing arms 12 and 14.

In this embodiment, coupling 30 includes another protruding miter positioning member 32, which is also referred to hereinafter as locator pin 32. Locator pin 32 is substantially centered on and extends from coupling 30 substantially perpendicularly with respect to the plane of tool 10, and in the same general direction as locator pin 20.

In the embodiment of the present invention depicted in the figures, coupling 30 is slidably mounted on central arm 16 for movement within a central slot 34 defined longitudinally in central arm 16. Locator pin 32 is substantially centered on coupling 30 and also is slidably engaged within central slot 34 by virtue of its connection with coupling 30. Preferably, coupling 30 may be tightened, by a threaded shaft and knob or similar device, so that coupling 30 remains in its position, thus preventing pivotal movement by tool 10.

An independent fastening assembly may also be used with the present invention, such as a wing-nut and threaded bolt, which can be tightened to lock coupling 30 in position along central slot 34. Other fastening assemblies which prohibit pivotal movement of left and right arms 12 and 14 may also be utilized.

Left elongate arm 12 and right elongate arm 14 are expandable along the longitudinal axis towards coupling 18. For example, this may be accomplished by including additional members of the same width as the arms 12 and 14, respectively, which are slidably attached thereto, or by including arms 12 and 14 which are telescoping or contain telescoping sections.

In this embodiment of the present invention, as shown in FIG. 3, extension members 36 having substantially the same width as arms 12 and 14, respectively, but greater longitudinal length, are attached to arms 12 and 14 via fasteners 38 to facilitate the modeling of exterior angles. Fasteners 38 may include bolts and wingnuts, hook and latch, or any other suitable fastening devices. It should be readily apparent to those skilled in the art that it is within the purview of the present invention to provide extension members 36 of various lengths, or extension members 36 which are adjustable, to accommodate a variety of exterior angles and surrounding conditions.

Figure 4:
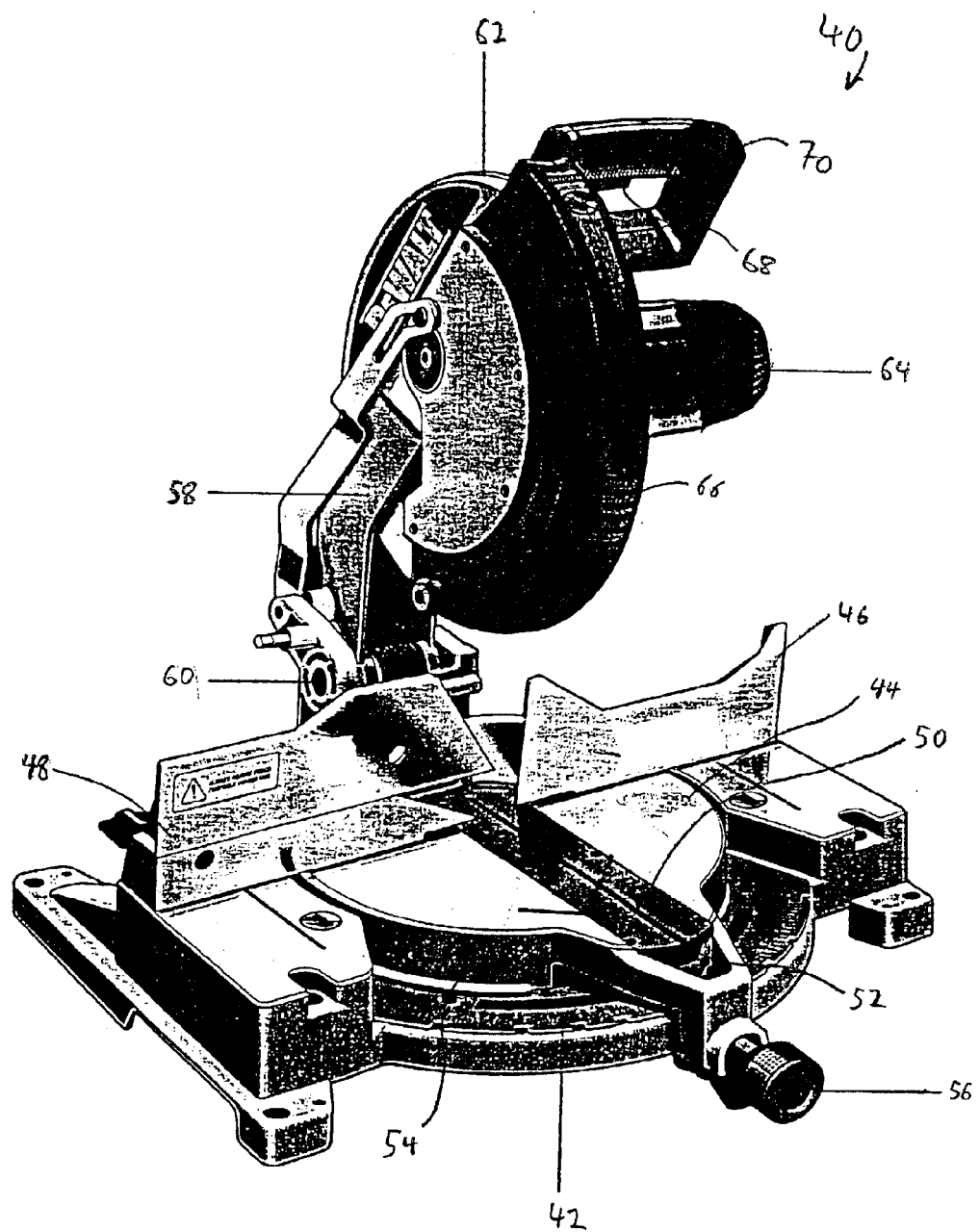
FIG. 4 is a perspective view of a power miter saw of generally standard design.

Referring now to FIG. 4, in which there is illustrated a preferred embodiment of a miter saw orientated for operation thereof, which employs a system constructed in accordance with the present invention designated generally by a reference numeral 40. Miter saw 40 is powered by an electrical connection to a home outlet, however, the source of power is not critical for the operation of the present invention.

Miter saw 40 includes a base 42 having a generally planar and circular work surface 44. A fence, consisting of a linearly aligned right side segment 46 and left side segment 48, is disposed perpendicularly with respect to work surface 44, is supported by base 42 so that it remains stationary as work surface 44 is rotated and is used to position and support a work piece against surface 44 for cutting. A kerf plate 50 with a longitudinal slot 52 is seated in surface 44 between right side fence segment 46 and left side fence segment 48. Kerf plate 50 is recessed so that it is substantially evenly aligned with surface 44. Slot 52 is located over an aperture in the work surface 44 (not shown) and sufficiently sized to receive a saw blade. Furthermore, slot 52 is sufficiently configured to engage pins 20 and 32 therein and may further include keyed notches, indents or the like for matching corresponding keyed elements in pins 20 and 32. Preferably, for safety reasons, among other things, kerf plate 50 is constructed of a resilient but non-ferrous material, such as plastic.

Figure 6:
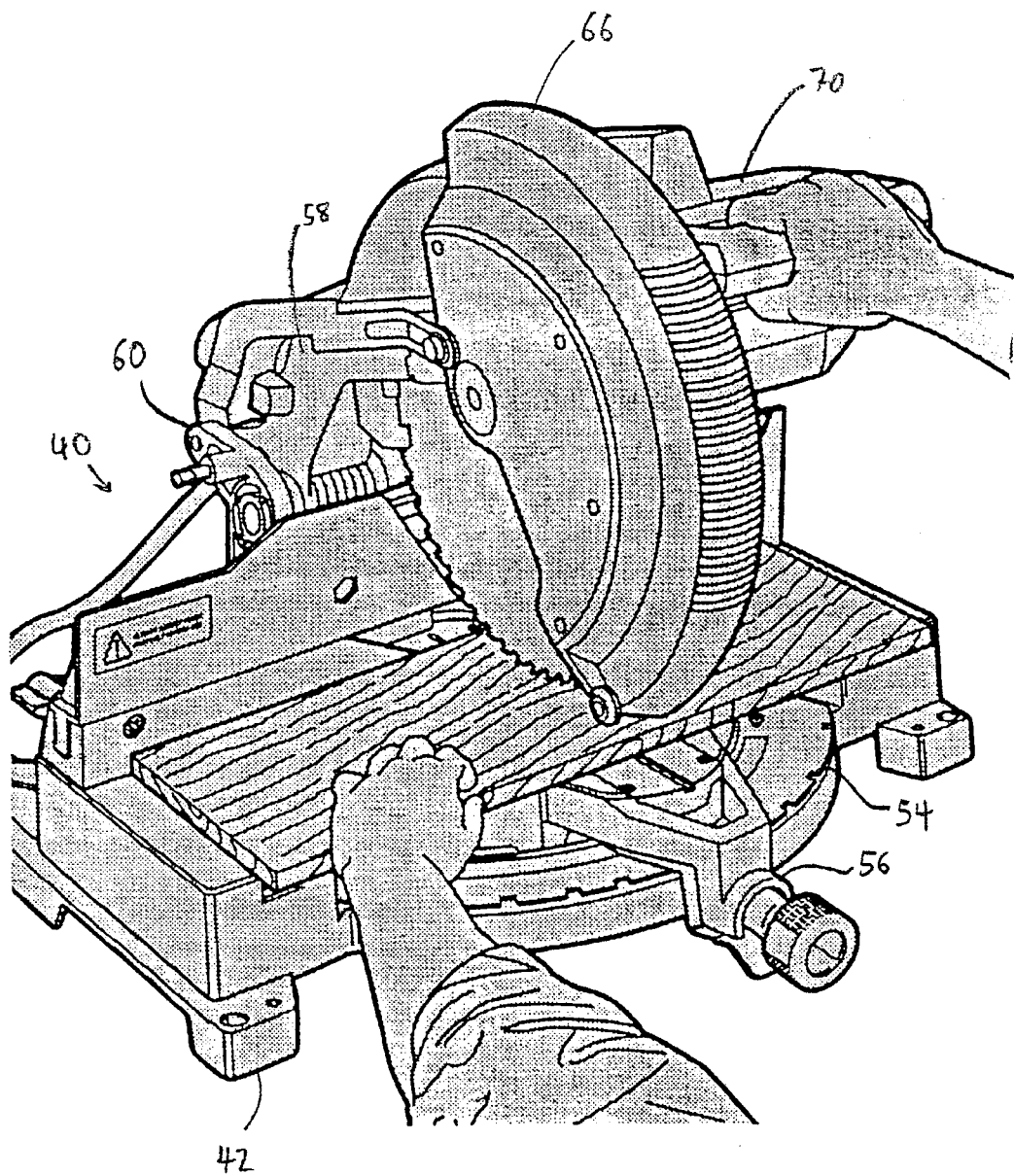
FIG. 6 is a perspective view of a miter saw shown in FIG. 4, illustrating the downward or cutting pivotal movement of the arm used to cut a workpiece placed on the worksurface.

Work surface 44 is disposed over a carriage 54 mounted on base 42 and configured for rotational movement in the horizontal plane. A locking clamp and knob assembly 56 is disposed on carriage 54 to facilitate movement of the carriage 54 along with work surface 44. An arm 58 is supported by a spring loaded pivot assembly 60 connected with carriage 54, which provides for pivotal movement of arm 58 thereby causing the circular blade 62 mounted on its upper portion to move through a vertical plane which is perpendicular to working surface 44, and passes through and is aligned with the rotational center of carriage 54 and with slot 52. FIG. 6 best illustrates the manner in which this pivotal movement is utilized to cut material. Pivot assembly 60 and clamp and knob assembly 56 are positioned in substantially opposed, radially outer portions of the carriage 54.

Figure 5:
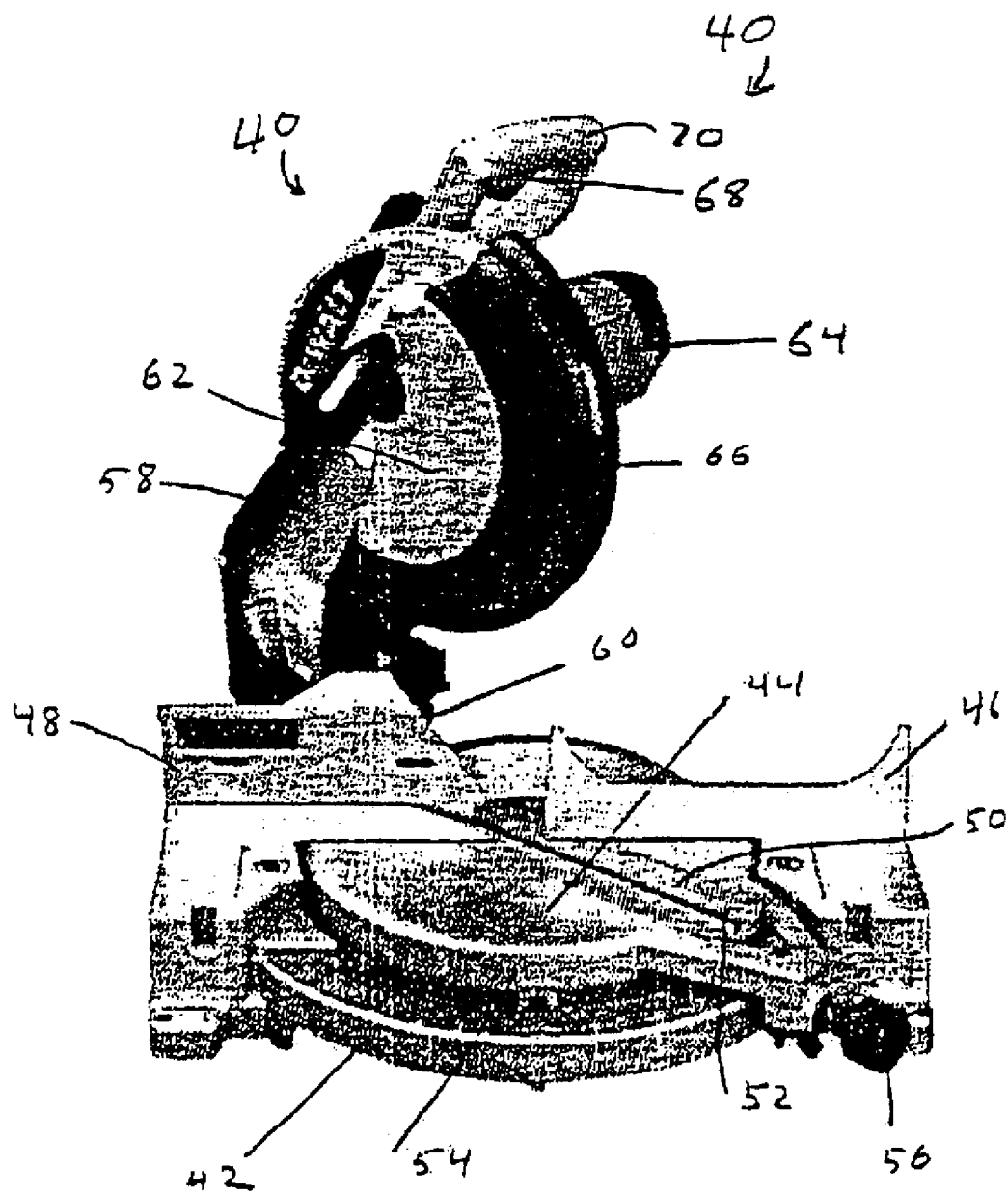
FIG. 5 is a front view of the miter saw shown in FIG. 4, illustrating the rotational movement of the working surface and pivotal arm provided by the rotatably mounted carriage.

Carriage 54 facilitates rotational movement of work surface 44 in excess of 45 degrees to the left and right relative to the center alignment (i.e., with slot 52 being set in a substantially perpendicular relationship with respect to base 42). FIG. 5 depicts miter saw 40 with carriage 54 rotated to the right and illustrates the manner in which work surface 44, slot 52 and arm 58 rotate with carriage 54 and maintain their respective positions relative to each other.

A circular blade 62, which is driven by an onboard motor 64 and covered by a retractable guard 66, is mounted for rotational motion on the upper portion of arm 58. A trigger switch 68 in electrical communication with motor 64 is positioned adjacent a handle 70 defined on arm 58 to facilitate activation of blade 62 while moving arm 58 to cut a workpiece on surface 44, as shown in FIG. 6.

The system in accordance with the present invention may be used in a variety of ways to produce highly accurate miter angle cuts. FIGS. 7–14 illustrate a preferred method for using tool 10 to model/measure an inside angle (i.e., formed by two recessing convergent surfaces) and transfer that angle to miter saw 40 for cutting a workpiece to fit within the inside angle accordingly.

As shown in FIG. 7, tool 10 is fit onto inside corner 80 by using right and left framing arms 12 and 14 to form a surrounding border about the convergence, thus matching the angle of inside corner 80, as defined by a left side surface 82 and right side surface 84, with arms 12 and 14. Once the convergence is modeled by tool 10, the fastener associated with coupling 30 is tightened to ensure that the "framed" position of arms 12 and 14 is maintained. In FIG. 8, tool 10 is placed on work surface 44 so that pins 20 and 32 are engaged in slot 52 of kerf plate 50. Using locking clamp and knob assembly 56, carriage 54 is rotated to move work surface 44, along with tool 10 while still engaged in slot 52, so that left arm 12 abuts left side fence segment 48 as shown in FIG. 9. After positioning work surface 44, tool 10 is then removed from kerf plate 50. As shown in FIG. 10, the workpiece is placed on surface 44 abutting right side and left side fence segments 46 and 48 before being cut by the saw. As shown in FIG. 1, one end of the cut workpiece matches half the angle of inside corner 80 and can be positioned to border left side convergent surface 82.

FIGS. 12–14 illustrate the same process for cutting another workpiece so that one end includes an angle matching the right side half of interior corner 80. The tool 10 is placed back into slot 52, and work surface 44 is rotated so that right arm 14 abuts right side fence segment 46. Tool 10 is removed and the workpiece is positioned against the right side and left side fence segments 46 and 48 before being cut. As shown in FIG. 14, the workpiece can be positioned against right side surface 84 so that the two workpieces fit together and form a border about inside corner 80.

FIGS. 15–22 illustrate the method for using tool 10 to model/measure the angle of an outside corner 86 formed by two projecting convergent surfaces, a left side surface 88 and a right side surface 90, and transfer that modeled angle to the miter saw 40 for cutting workpieces to border the outside corner 86.

As shown in FIG. 15, extension members 36 are attached to right and left arms 12 and 14, respectively, to frame outside corner 86. Once the convergence is modeled, arms 12 and 14 are held in position by tightening the fastener associated with coupling 30. Extension members 36 are removed and tool 10 is fit into slot 52 of kerf plate 50, as shown in FIG. 16. In FIG. 17, work surface 44 is rotated so that left arm 12 abuts left side fence segment 48. Tool 10 is removed and the workpiece is placed on surface 44 for cutting with miter saw 40, as shown in FIG. 18. For an outside corner such as corner 86, the workpiece cut with the tool 10 abutting left side fence segment 48 will provide the border for right side surface 90, as shown in FIG. 19.

As depicted by FIGS. 20–22, the process is similar for producing a workpiece that can border left side surface 88 and fit with the right side surface workpiece about outside corner 86.

The present invention is advantageously adapted to existing miter saws without redesigning or reconfiguring existing equipment, or changing the design of the present invention. As shown in FIG. 23, any existing kerf plate on a miter saw can be removed by screws 92 and replaced by a kerf plate in accordance with the present invention. The kerf plate may also consist of two parts, each of which defines one half of the central slot.

FIGS. 24 and 25 illustrate the manner in which a tool 10 constructed in accordance with the present invention, as described above, may be used in conjunction with a hand miter saw which is generally designated by the reference numeral 140.

Hand miter saw 140 includes a base 142 having a rotatably mounted carriage 154 which is configured for rotational movement in the horizontal plane and which supports a generally planar and circular work surface 144. A fence, consisting of linearly aligned right side and left side segments 146 and 148 is used to position and support a workpiece against surface 144 for cutting. The fence is perpendicular to work surface 144 and is supported by base 142 so that it remains stationary as work surface 144 rotates.

A substantially planar kerf plate 150 with a longitudinal slot 152 is seated in surface 144 between right side fence segment 146 and left side fence segment 148. Kerf plate 150 is recessed so that it is substantially evenly aligned with surface 144. Slot 152 is sufficiently sized to receive a saw blade, is located over an aperture in work surface 144 and is configured to engage locator pins 20 and 32 from tool 10 therein. Slot 152 may further include keyed notches, indents or the like for matching corresponding keyed elements in pins 20 and 32. Preferably, kerf plate 150 is constructed of a resilient but non-ferrous material such as plastic.

A locking clamp and knob assembly 156 is disposed on carriage 154 to facilitate movement of carriage 154 along with work surface 144. Braces 194 and 196 are supported by carriage 154 for rotational movement therewith. Braces 194 and 196 project above work surface 144 in a spaced relationship at either end of slot 152. Both braces 194 and 196 contain a slot 198 disposed in the same place, perpendicularly with respect to work surface 144. Slots 198 are configured and dimensioned to receive a hand saw without restraining the movement in slots 198 associated with cutting. Preferably, the hand saw is of the type commonly known as a back saw. Braces 194 and 198 with slots 198 are mounted and configured to align a hand saw positioned therein with slot 152 in kerf plate 150.

Tool 10 would be used to model/measure an angle formed by either exterior or interior convergent surfaces in the same manner as in the previous embodiment. The angle is transferred to miter saw 140 in substantially the same manner as described above and illustrated in FIGS. 7 through 22, except the workpiece is cut with a hand saw.

While the systems and methods for using the system contained herein constitute preferred embodiments of the invention, it is to be understood that the invention is not limited to these precise systems and methods of use, and that changes may be made thereto without departing from the scope of the invention which is defined in the appended claims.

What is claimed is:

1. A combination angle bisecting tool and miter saw comprising:

a) A tool for bisecting an angle formed by two convergent surfaces including:
  (i) first and second elongate framing arms pivotally coupled to each other at an end thereof, whereby the framing arms can be positioned adjacent to the converging surfaces of an internal angle;
  (ii) first and second extension arms attached to or which may be attached to said first and second framing arms providing a means for extending the first and second framing arms alone their respective longitudinal axes and across their pivotal coupling whereby the extension arms can be positioned adjacent to the converging surfaces of an external angle;
  (iii) first and second support links, each pivotally coupled to a framing arm at a point which is equidistant from the pivotal coupling and outside edges of the framing arms, the support links being pivotally coupled to each other at a point equidistant from their respective pivotal coupling with the framing arms;
  (iv) fastening means for temporarily setting the first and second framing arms in a desired angular relationship facilitated by the pivotal coupling of the first and second framing arms, pivotal couplings of the first and second support links to the first and second framing arms, and the pivotal coupling of the first and second support links to each other;
  (v) at least two positioning members extending substantially perpendicular to the plane of the tool whereby the axis formed between the positioning members bisects the angle formed by the coupling of the first and second framing arms; and
 b) a miter saw including:
  (i) a rotatable planar work surface;
  (ii) a stationary guide fence for supporting the work piece in an angular relationship for cutting with a saw; and
  (iii) receiving means for the at least two positioning members in the rotatable work surface, whereby alternate rotation of the work surface such that the first and second framing arms abut alternate sides of the guide fence positions the work surface for cutting a work piece along the axis formed between the positioning members.

2. A miter cutting system as recited in claim 1, wherein the tool further comprises an elongate central arm having a central slot defined longitudinally therein, wherein the pivotal coupling of the first and second support links is slidably mounted on the central arm for movement within the central slot.

3. A system as recited in claim 2, wherein the fastening means is associated with the slidably mounted coupling and is configured to control the movement of the coupling along the central slot.

4. A miter cutting system as recited in claim 1, wherein the receiving means for the at least two positioning members in the rotatable work surface is a slot in the work surface for receiving the saw.

5. A miter cutting system as recited in claim 1, wherein the first positioning member is associated with the pivotal coupling of the first and second framing arms and the second positioning member is associated with the pivotal coupling of the first and second support links to each other.

6. A miter cutting system as recited in claim 1, further comprising an arm having a first end attached to the rotatable work surface for rotational motion therewith and a second end including a housing and an electrically powered circular saw therein, wherein the arm includes a pivoting means for pivoting the second end relative to the first end for cutting a work piece supported on the work surface.

7. A method for mitering two pieces of material to frame converging surfaces, comprising the steps of:
   a) applying a tool at the convergence of the converging surfaces to model the angle of convergence, the tool comprising:
      (i) first and second elongate framing arms pivotally coupled to each other at an end thereof, whereby the framing arms can be positioned adjacent to the converging surfaces of an internal angle;
      (ii) first and second extension arms attached to or which may be attached to said first and second framing arms providing a means for extending the first and second framing arms along their respective longitudinal axes and across their pivotal coupling whereby the extension arms can be positioned adjacent to the converging surfaces of an external angle;
      (iii) first and second support links, each pivotally coupled to a framing arm at a point which is equidistant from the pivotal coupling and outside edges of the framing arms, the support links being pivotally coupled to each other at a point equidistant from their respective pivotal couplings with the framing arms;
      (iv) fastening means for temporarily setting the first and second framing arms in a desired angular relationship facilitated by the pivotal coupling of the first and second framing arms, pivotal coupling of the first and second support links to the first and second framing arms, and the pivotal coupling of the first and second support links to each other;
      (v) at least two positioning members extending substantially perpendicular to the plane of the tool, whereby the axis formed between the positioning members bisects the angle formed by the coupling of the first and second framing arms;
   b) locking the tool to maintain the first and second framing arms in a position corresponding to the angle of convergence;
   c) retracting or removing the extension arms if the angle of convergence is an exterior angle;
   d) affixing the tool to a miter cutting system, the miter cutting system comprising:
      i) a rotatable planar work surface and stationary guide fence for supporting a work piece and positioning the work piece in an angular relationship for cutting with a saw;
      ii) receiving means for the at least two positioning members in the rotatable work surface, whereby alternate rotation of the work surface such that the first and second framing arms abut alternate sides of the guide fence positions the work surface for cutting a work piece along the axis formed between the positioning members;
   e) the positioning members of the tool being received by the receiving means, rotating the work surface until one of the framing arms contacts the guide fence;
   f) positioning a first work piece on the work surface in alignment with the guide fence and cutting the work piece with a saw;
   g) removing the cut work piece;
   h) the positioning members of the tool being received by the receiving means, rotating the work surface until the other one of the framing arms contacts the guide fence;
   i) positioning a second work piece on the work surface in alignment with the guide fence and cutting the work piece with a saw; and
   j) removing the cut workpiece.

8. A method for mitering two pieces of material to frame converging surfaces according to claim 7, wherein the tool further comprises an elongate central arm having a central slot defined longitudinally therein, wherein the pivotal coupling of the first and second support links is slidably mounted on the central arm for movement within the central slot.

9. A method for mitering two pieces of material to frame converging surfaces according to claim 8, wherein the fastening means is associated with the slidably mounted coupling and is configured to control the movement of the coupling along the central slot.

10. A method of mitering two pieces of material to frame converging surfaces according to claim 7, wherein the receiving means for the at least two positioning members in the rotatable work surface is a slot in the work surface for receiving the saw.

11. A method for mitering two pieces of material to frame converging surfaces according to claim 7, wherein the first positioning member is associated with the pivotal coupling of the first and second framing arms and the second positioning member is associated with the pivotal coupling of the first and second support links to each other.

12. A method for mitering two pieces of material to frame converging surfaces according to claim 7, wherein the miter cutting system further comprises an arm having a first end attached to the rotatable work surface for rotational motion therewith and a second end including a housing and an electrically powered circular saw therein, wherein the arm includes a pivoting means for pivoting the second end relative to the first end for cutting a work piece supported on the work surface.

* * * * *